United States Patent [19]

Rinehart et al.

[11] Patent Number: 5,183,523

[45] Date of Patent: Feb. 2, 1993

[54] APPARATUS FOR ULTRASONICALLY BONDING ENDCAPS TO A CONTAINER OF DISSIMILAR MATERIAL

[75] Inventors: Steven R. Rinehart, Midlothian; Jonah Adams, Jr., Chesterfield, both of Va.

[73] Assignee: Philip Morris Incorporated, New York, N.Y.

[21] Appl. No.: 567,806

[22] Filed: Aug. 15, 1990

[51] Int. Cl.⁵ ............................................. B31B 1/64
[52] U.S. Cl. ................................... 156/367; 156/64; 156/73.1; 156/378; 156/580.2; 53/374.9
[58] Field of Search ............... 156/64, 73.1, 367, 378, 156/580.1, 580.2; 53/374.9, 417

[56] References Cited

U.S. PATENT DOCUMENTS

| Re. 29,568 | 3/1978 | Braun ................................. 156/580.2 |
|---|---|---|
| 1,449,073 | 3/1923 | Thom . |
| 3,391,780 | 7/1968 | Pasquine .............................. 206/41 |
| 3,427,932 | 2/1969 | Wagner ............................... 93/55.1 |
| 3,438,824 | 4/1969 | Balamuth ............................ 156/69 |
| 3,852,144 | 12/1974 | Parry ................................... 156/510 |
| 3,929,271 | 12/1975 | Meyers ............................... 229/4.5 |
| 3,956,975 | 5/1976 | Egleston et al. ..................... 93/49 M |
| 3,960,624 | 6/1976 | Erlandson ........................... 156/69 |
| 4,035,982 | 7/1977 | Paules ................................. 53/417 |
| 4,057,444 | 11/1977 | Prot .................................... 156/69 |

(List continued on next page.)

FOREIGN PATENT DOCUMENTS

| 0038488 | 10/1981 | European Pat. Off. . |
|---|---|---|
| 0142557 | 11/1985 | European Pat. Off. . |
| 0167645 | 1/1986 | European Pat. Off. . |
| 0269476 | 6/1988 | European Pat. Off. . |
| 1704276 | 4/1971 | Fed. Rep. of Germany . |

(List continued on next page.)

OTHER PUBLICATIONS

Gary Flood, "Ultrasonic Energy, A Process for Laminating and Bonding Nonwoven Web Structures", 12th Technical Symposium—Association of the Nonwoven Fabrics Industry, Washington, D.C., pp. 90–103, May 22–23, 1984.

Steven T. Gallagan, "Material and Additive Factors in Ultrasonic Assembly", ANTEC '85, pp. 850–854.

Steven T. Gallagan, "Laying the Groundwork for Ultrasonic Welding", Plastics Engineering, pp. 35–37, Aug. 1985.

W. Land, "Investigations into the Process of Ultrasonic Welding", Kunst Ger. Plast., pp. 16–18, Apr. 1978.

A. Shoh, "Welding of Thermo-plastics by Ultrasound", Ultrasonics, Sep. 1976, England, pp. 209–216.

Fred V. Vitale, "Today's Uses of Ultrasonics in Medical Device Manufacturing".

(List continued on next page.)

Primary Examiner—Robert A. Dawson
Assistant Examiner—David Reifsnyder
Attorney, Agent, or Firm—Nicola A. Pisano

[57] ABSTRACT

A method and apparatus are provided for ultrasonically bonding endcaps to a food or tobacco product container comprised of a material dissimilar from the endcaps. Ultrasonic vibration is applied to the joint between the container and the endcaps, which includes a strip of preapplied adhesive, so that the adhesive partially melts. The partially melted adhesive quickly resolidifies, providing a durable bond without the disadvantageous and time consuming use of wet glues. The apparatus includes a pair of opposingly mounted ultrasonic devices, a controller associated with each ultrasonic device, and a general purpose computer programmed to synchronize and mointor the controllers.

13 Claims, 5 Drawing Sheets

U.S. PATENT DOCUMENTS

| | | | |
|---|---|---|---|
| 4,072,089 | 2/1978 | Bosche | 93/44.1 GT |
| 4,141,463 | 2/1979 | Smith | 220/359 |
| 4,159,220 | 6/1979 | Bosch et al. | 156/73.1 |
| 4,179,864 | 12/1979 | Focke | 53/388 |
| 4,183,457 | 1/1980 | Loughley | 229/5.5 |
| 4,241,560 | 12/1980 | Deimel et al. | 53/373 |
| 4,444,308 | 4/1984 | MacEwen | 206/249 |
| 4,484,432 | 11/1984 | Oberdorf | 53/575 |
| 4,534,818 | 8/1985 | Kreager et al. | 156/581 |
| 4,606,462 | 8/1986 | Bogren | 206/606 |
| 4,734,142 | 3/1988 | Creswell | 156/580.1 |
| 4,747,894 | 5/1988 | Johnston et al. | 156/73.1 |
| 4,750,955 | 6/1988 | Haguenier | 156/69 |
| 4,923,059 | 5/1990 | Evers et al. | 206/265 |
| 4,954,191 | 9/1990 | Delespaul et al. | 156/73.1 |

FOREIGN PATENT DOCUMENTS

| | | |
|---|---|---|
| 2833577 | 2/1980 | Fed. Rep. of Germany . |
| 3447771A1 | 7/1986 | Fed. Rep. of Germany . |
| 57-4726 | 1/1982 | Japan . |
| 58-28337 | 2/1983 | Japan . |
| 1264589 | 2/1972 | United Kingdom . |
| 1306782 | 2/1973 | United Kingdom . |

OTHER PUBLICATIONS

J. Wolcott, "Recent Advances in Ultrasonic Technology", *Plastics Create a World of Difference—Proceedings of the SPE 47th Annual Technical Conference & Exhibits: ANTEC '89*, pp. 502–506.

Constance Carlson, "Ultrasonic Assembly of Plastic Medical Devices", *Medical Device and Diagnostic Industry*, Mar. 29, 1984, pp. 32–35.

Branson Data Sheets 900-3, 900-7, 900-1; 900 M Product Literature; Ultrasonic Plastics Assembly printed Apr. 1988.

Kunstoffe, vol. 56, No. 6, Jun. 1966, pp. 436–438 "Verbinden und Trennen von Kunststoffen mit Ultraschall".

APPARATUS FOR ULTRASONICALLY BONDING ENDCAPS TO A CONTAINER OF DISSIMILAR MATERIAL

BACKGROUND OF THE INVENTION

This invention relates generally to a method and apparatus for ultrasonically sealing endcaps to a container for use in packaging food or tobacco products.

Methods and apparatus for sealing food or tobacco product containers constructed of dissimilar materials, for example paper and thermoplastic, have generally involved the use of wet adhesives qualified for use in the food and tobacco industry. Such adhesives may take considerable time to set sufficiently for the container to be handled by automated equipment, so that further handling of the package does not ruin the seal. Since adhesives used in the food and tobacco packaging industry must be qualified for such characteristics as toxicity, taste and odor, these characteristics have taken precedence over concerns such as the adhesive setting and drying times.

A further disadvantage inherent in using conventional glues to attach or seal food or tobacco product packages is the rate at which packages can be moved through the packaging machine. Aside from the difficulties attendant in handling the wet-glued packages, alluded to above, the time for a conventionally glued package to set can become the limiting time on a food or tobacco packaging production line, thus slowing down an assembly operation otherwise capable of much greater throughput.

Yet another disadvantage of using wet glues in packaging food and tobacco products is the tendency of the glue to smear onto and ruin the exterior of the packaging, resulting in an unacceptable end product. A need therefore exists for a method of sealing such packages which obviates the use of wet glues and which is cleaner than the previously known methods.

Accordingly, a principle advantage of the method and apparatus of the present invention is the use an ultrasonic device to seal food or tobacco containers. Ultrasonic apparatus have been used for cutting and welding plastics in numerous fields such as the automotive, electronics and medical device industries. For example, Parry U.S. Pat. No. 3,852,144 describes a method for cutting and seaming materials with a high thermoplastic content. Ultrasonic apparatus have also been used for sealing plastic and plastic covered items in the food industry because of its ability to weld through contaminated areas and its nontoxicity relative to conventional glues for sealing plastics. Bogren U.S. Pat. No. 4,606,462, for example, involves the ultrasonic welding of the plastic-to-plastic interface created during construction of a powder proof container from a plastic laminated cardboard blank. Ultrasonic devices have also found application in gluing paper and other cellulosic materials using a starch and water adhesive, as described in Johnston et. al. U.S. Pat. No. 4,747,894.

In an ultrasonic device, such as the 900 SERIES manufactured and marketed by Branson Ultrasonics Corporation, electrical energy is converted to mechanical energy—vibration—through a converter. The converter is attached to an acoustical horn (similar in concept to a tuning fork) which contacts and transmits the vibratory energy of the converter to the workpiece. This vibration manifests itself as heat induced by friction between the pieces to be joined, whereby the plastic at the joint briefly becomes molten. When the molten plastic solidifies, a strong molecular bond results.

Previously known methods of applying ultrasonic devices have been limited to welding similar materials, generally plastics. While ultrasonic apparatus have been used for embedding a material in a dissimilar base material, such apparatus have not heretofore been used for sealing food or tobacco product containers comprised of a thermoplastic portion and a non-thermoplastic portion. Furthermore, previously known packaging machines employing ultrasonics for thermoplastics have been slowed by the need to reposition a work piece to complete a welding or fastening task where the workpiece presented a complicated geometry.

In view of the foregoing, it is therefore an object of the present invention to provide a method and apparatus for sealing a food or tobacco product container comprised of dissimilar materials, i.e., having a thermoplastic portion and a non-thermoplastic portion, with an apparatus using an ultrasonic device.

It is further object of the present invention to provide a method and apparatus for sealing a food or tobacco product container comprised of is similar materials without the use of conventional wet glues, so that the sealed container may be carried by automated handling in a time period substantially shorter than that required when handling containers sealed with conventional glues.

It is another object of this invention to provide a method and apparatus for sealing such packages which is cleaner than the previously known method employing conventional wet glues.

It is still another object of present invention to provide an apparatus for sealing a food or tobacco product container using an ultrasonic device which obviates the need to reposition the workpiece on the apparatus when sealing a container having a complicated geometry and which apparatus is therefore capable of improved throughput than would otherwise be possible.

SUMMARY OF THE INVENTION

In the method and apparatus of the present invention an apparatus including an ultrasonic device is used to attach a thermoplastic (hereinafter interchangeably referred to as plastic) container portion to a nonplastic container portion having a preapplied strip of food and tobacco qualified adhesive. The method and apparatus feature a pair of conventional ultrasonic devices arranged in an opposing fashion, so that the acoustical horns of ultrasonic devices contact substantially all of the circumference of the container to be sealed. The invention also provides for means for synchronizing the operation of the pair of ultrasonic devices so that the container is sealed on all sides simultaneously. The apparatus of the invention includes means for estimating the quality of the seal and for ejecting a successfully sealed package from the apparatus. The method and apparatus of the present invention obviate the use of conventional wet glues in sealing food or tobacco product containers comprising dissimilar materials and correspondingly results in significantly increased throughput of a sealing machine practicing the present invention relative to one employing conventional adhesives.

BRIEF DESCRIPTION OF THE DRAWINGS

Other objects, features and advantages of the invention will be apparent upon consideration of the following description, taken in conjunction with the accompanying drawings, in which like reference numerals refer to like parts throughout, and in which.

DESCRIPTION OF THE PREFERRED EMBODIMENT

Figure 1:
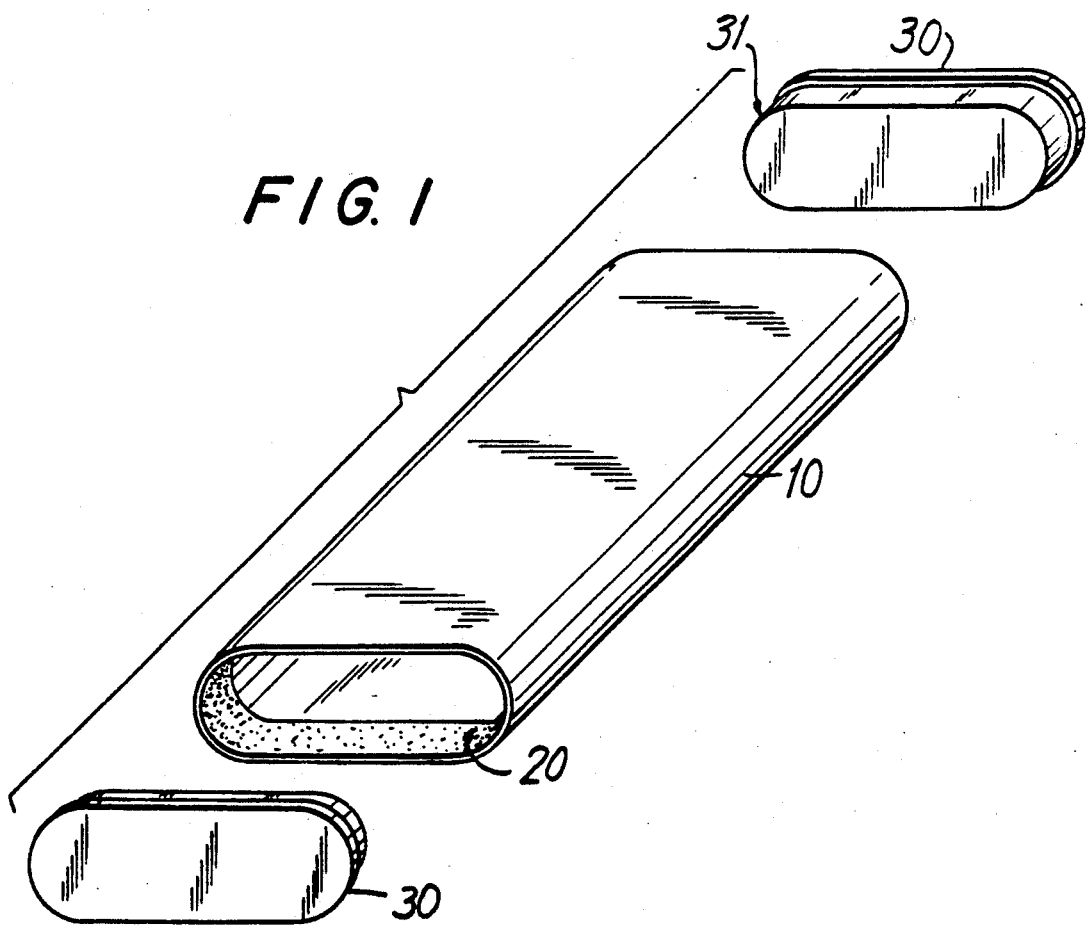
FIG. 1 is an exploded view of a tobacco product container and endcap according to the method of the present invention.

In FIG. 1 there is shown a food or tobacco product container constructed in accordance with the principles of this invention. The container comprises an open ended oval paperboard tube 10. Tube 10 has disposed on its inner surface at each end a preapplied strip of food and tobacco qualified adhesive 20. Plastic endcaps 30 having a slight recess 31 on the inner surface (approximately the thickness of the wall of tube 10) are ultrasonically attached to the ends of tube 10 using the apparatus described hereinafter. In a specific application of the method of the present invention to a tobacco product container, the oval tube is constructed of 12-point paperboard and the endcaps are constructed of polyethylene. A commercially available food and tobacco qualified adhesive, Pierre Stevens No. 7720, was preapplied in strips approximately one-eighth inch in length inward from each end of the tube during the manufacture of the blanks from which the tube is made. This adhesive has a melting point of about 230° F.

Figure 2:
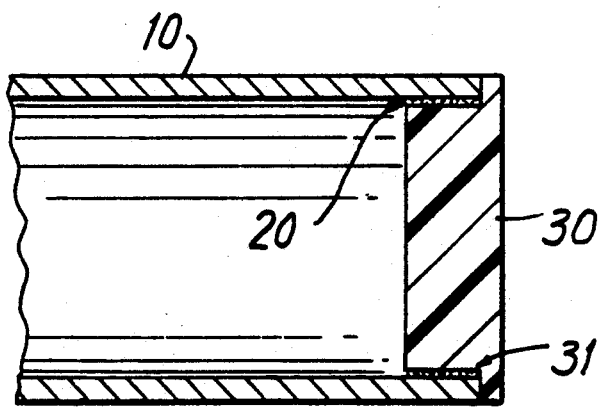
FIG. 2 is a partial sectional view of a bond between an endcap and a dissimilar material container obtained in accordance with the principles of the invention.

According to the method of this invention, the endcaps 30 are inserted into and frictionally engaged with tube 10. The acoustical horns of the ultrasonic devices, described in detail hereafter, are brought into contact with the tube along the lateral edges of the ends of tube 10. The ultrasonic device is then activated, inducing high frequency vibration at the circumferential joint between tube 10 and endcap 30. This energy deposition manifests itself as frictional heat, causing the preapplied adhesive 20 to melt, thereby sealingly joining endcap 30 to tube 10. The molten adhesive almost instantaneously cools, providing a durable bond between the dissimilar materials constituting the tube 10 and endcap 30, as shown in FIG. 2. Because of the localized nature of the ultrasonic energy deposition, there is no scorching of the tube 10 or endcap 30.

For the specific tobacco product container application described heretofore, it has been determined, based on parametric evaluation of sample runs, that for an ultrasonic device operating at a frequency of 20 kHz, about 350 milliseconds is required to deposit a total energy in the range of 90 to 125 Joules (target of 100 J) at the pair of endcaps to obtain sufficient melting of the adhesive to provide a durable bond. If the energy deposition is outside this preferred range, it has been observed that the seals are usually defective.

It is be understood that the parameters used for ultrasonically sealing other combinations of dissimilar materials and adhesives will require different time and total energy deposition ranges, but such parameters can be easily ascertained by conducting parametric evaluations of sample runs using the new container designs, as is well known to those in the packaging field.

Figure 3:
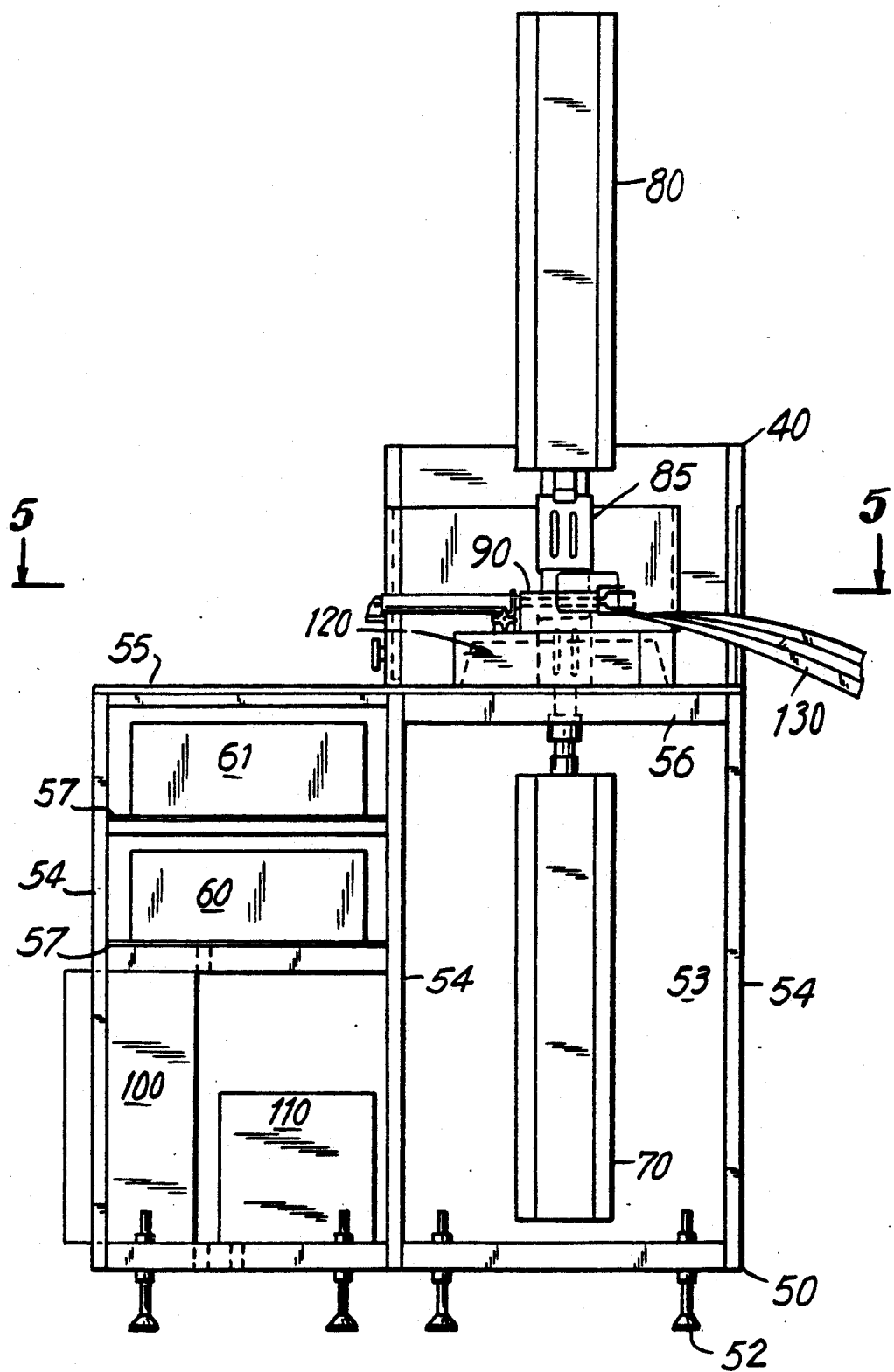
FIG. 3 is a front elevation view of the container sealing apparatus.
Figure 4:
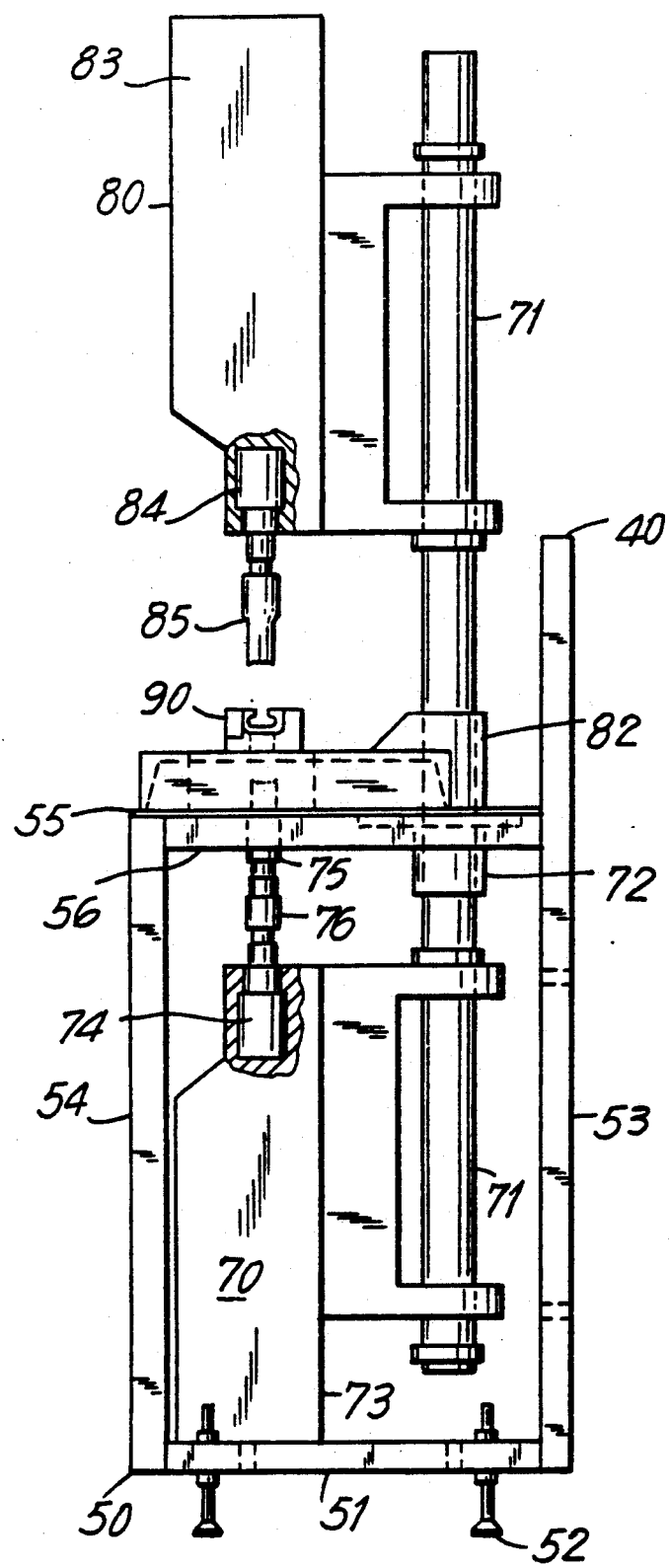
FIG. 4 is a partial fragmentary side elevation view of the container sealing apparatus.

Referring now to FIGS. 3 and 4, there is shown an apparatus, generally designated 40, constructed in accordance with the principles of this invention, for ultrasonically sealing food or tobacco product containers comprised of dissimilar materials. The apparatus is comprised of a rigid frame 50 having a plurality of horizontal base members 51 supported on a plurality of adjustable legs 52, a vertical back wall 53 fixedly secured to base members 51, front vertical support members 54 fixedly secured to base members 51, and horizontally disposed working surface 55 projecting from back wall 53 and fixedly secured to back wall 53 and front vertical support members 55. Working surface 55 obtains additional support from upper support members 56 fixedly secured to the back wall 53 and the front vertical support members 54 along the sides of the frame 50 and between the frame members 54. Frame 50 includes shelves 17 for carrying the control means 60, 61 associated with the ultrasonic devices, generally designated 70 and 80.

A pair of conventional ultrasonic devices 70, 80 are opposingly adjustably mounted in frame 50 on vertical support column 71. Support column 71 is securedly mounted to the underside of working surface 55 by flange 72 and by base 82 provided with the ultrasonic device by the manufacturer. Each ultrasonic device includes a housing 73, 83 containing electrical apparatus, a converter 74, 84 for converting electrical energy to mechanical energy, and an acoustical horn 75, 85, for transmitting the mechanical energy to the workpiece. Because of the longer distance which must be traversed by horn 75, an extension bar 76 is connected between converter 74 and horn 75 of lower ultrasonic device 70. Base 82 of upper ultrasonic device 80 has a work block 90 mounted thereon for holding the container 10 during the sealing operation. Base 82 and work block 90 have a hole 91 therethrough by which the acoustical horn 75 of lower ultrasonic device 70 contacts container 10 when the container is situated in work block 90. Chute 130, leading from work block 90 to the balance of the container processing equipment via belt conveyor 131, is also shown in FIG. 3.

Conventional controller means 60 and 61 (obtained from the ultrasonics device manufacturer) associated with ultrasonic devices 70 and 80, respectively, are carried on shelves 57 of frame 50. General purpose computer 100 and transformer 110 are disposed beneath the controller means 60 on horizontal base members 51. Control panel 120 includes push-buttons to activate the sealing sequence, a reset button, and a safety cut-off switch. General purpose computer 100 is programmed by conventional methods to synchronize the operation of upper and lower ultrasonic devices 70 and 80. Computer 100 also monitors the output of controller means 60 and 61 and compares this output to the desired time and energy deposition ranges described earlier using well known programming techniques. Computer 100 is programmed to signal actuation of pneumatic handling devices, described hereinafter, and to alert the operator of an improper seal or other abnormal conditions.

Figure 5:
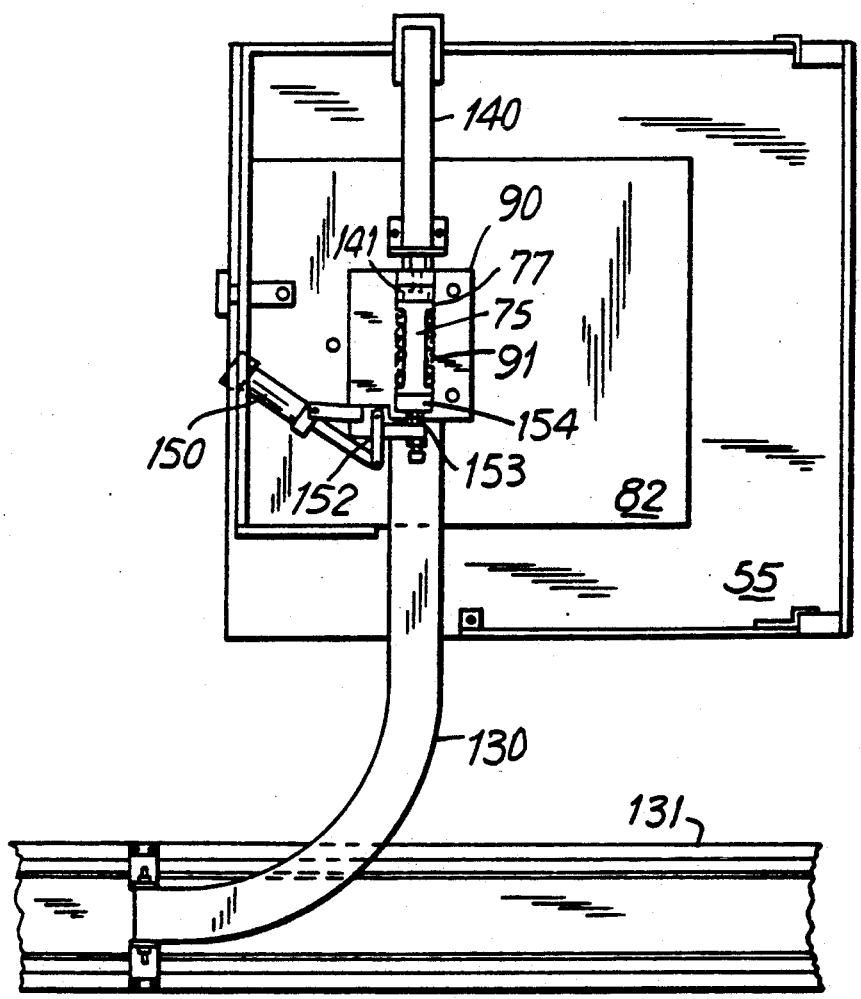
FIG. 5 is a plan view of the working area of the sealing apparatus taken from the line 5—5 in FIG. 3.
Figure 6:
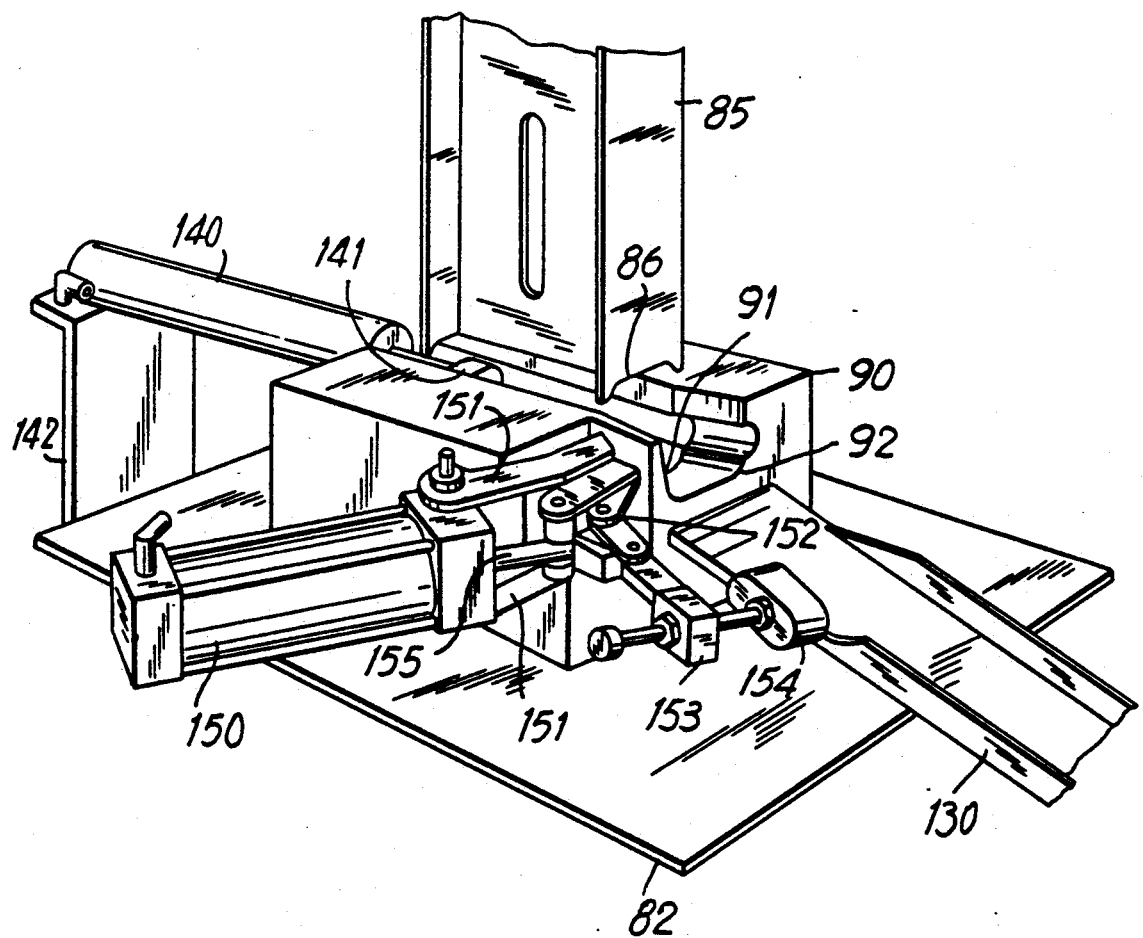
FIG. 6 is a partial fragmentary perspective view of the working area of the sealing apparatus.

Referring now to FIGS. 5 and 6, there is shown working surface 55 with base 82 and work block 90 mounted thereon. In FIG. 5, horn 75 of lower ultrasonic device 70 is visible through hole 91 in work block 90 and base 82. Work block 90 has a U-shaped depression 92 across its width, which opens into hole 91 at a short distance inward from the work block ends. Pneumatic cylinder 140, having oval pad 141 mounted on the end of its piston rod, is mounted on support member 142. Support member 142 is in turn fixed to base 82. In its retracted position, oval pad 141 of cylinder 140 is disposed adjacent the U-shaped depression 92 of work block 90, so that the end joints of a container 10 placed in work block 90 register with the protrusions from acoustical horns 75 and 85. Pneumatic cylinder 150, supported by members 151 affixed to work block 90, has its piston rod 155 attached to linkage 152, which linkage is rotatably mounted on work block 90. An oval pad 154 is mounted on arm 153. Arm 153 is affixed to linkage 152, so that when piston rod 155 of cylinder 150 extends, oval pad 154 rotates into the U-shaped depression 92 of work block 90 and thereby contacts the endcap 30 of a container 10 positioned therein.

In FIG. 6, the curved contact portions 86 of acoustical horn 85 are visible. Contact portion 86 is curved to fit upper one-half of the circumference of container 10. It is to be understood that the configuration of the contact portions 77 of horn 75 of lower ultrasonic device 70 (not visible in FIG. 6) are identical. Thus when contact portions 77 and 86 are in contact with container 10, they surround substantially the entire circumference of the joint between tube 10 and endcaps 30.

It is to be understood that the configuration of the contact portions 77, 86 may be varied according to the container geometry to be sealed. The manufacturer of the horns then uses known technology to size the balance of the horns 75, 85 to obtain the maximum vibrational energy utilization of the horns at the preselected frequency (generally either 20 or 40 kHz).

OPERATION OF THE APPARATUS

The sequence of operation of the ultrasonic container sealing apparatus constructed in accordance with the principles of the invention is now described.

A container 10 having frictionally engaged endcaps 30 in contact with preapplied adhesive strips 20 is manually placed into the U-shaped depression 92 of work block 90 so that one endcap 30 abuts against oval pad 141 of cylinder 140. The operator then pushes the appropriate buttons on control panel 120 to initiate the sealing sequence.

Pneumatic cylinder 150 is extended, causing arm 153 to rotate oval pad 154 into contact with the other endcap 30 of tube 10, thereby assuring that tube 10 is properly registered in U-shaped depression 92. Horns 75 and 85 of ultrasonic devices 70 and 80 are then simultaneously advanced toward tube 10 by conventional means (supplied by the ultrasonic device manufacturer) contained within housings 73 and 83. The rate of advance of the horns is controlled by controller means 60 and 61, which are in turn synchronized by suitably programmed general purpose computer 100. Horn contact portions 77 and 86 contact the ends of container 10 at a position in approximate alignment with endcaps 30. Conventional load cells (supplied by the ultrasonics device manufacturer) contained within housings 77 and 86 measure the load exerted by the horn contact portions 77 and 86 on the container 10 until a preselected load in obtained (for example 20 pounds), at which point the converters 74 and 84 of ultrasonics devices 70 and 80 are activated.

When the converters 74 and 84 are activated, controller means 60, 61 monitor the duration and magnitude of energy input to container 10. Suitably programmed general purpose computer 100 likewise monitors the output of controller means 60 and 61 to assure that the energy and time parameters are within predefined acceptable ranges. Vibratory mechanical energy transmitted to the circumferential joint between tube 10 and endcaps 30 generates sufficient heat by friction of the parts against each other to partially melt preapplied adhesive 30. The partially melted adhesive 30 resolidifies within a fraction of a second, resulting in a strong bond between dissimilar materials not previously known to be obtainable with ultrasonic devices.

Once the predetermined energy deposition and duration have been achieved, horns 75 and 85 are retracted, and piston rod 155 of cylinder 150 is retracted, moving oval pad 154 away from endcap 30 through an arcuate path. If the energy deposition and time are determined by computer 100 to be within predefined acceptable ranges, cylinder 140 is actuated, whereby oval pad 141 ejects the sealed container onto chute 130, whence it slides to belt conveyor 131 for further processing. In the event that an abnormal condition has occurred or the parameters have exceeded the acceptable ranges, computer 100 will sound an alarm and cancel the signal which actuates cylinder 140, hence the operator will be required to remove the defectively sealed container from work block 90.

Although a preferred embodiment of the invention has been heretofore described, the scope of the invention is to be determined by the claims appended hereto.

What is claimed is:

1. Apparatus for ultrasonically sealing a food or tobacco container comprised of a tube and an endcap, said endcap engaged with said tube, said apparatus comprising:
   a. a frame;
   b. a work block having a hole therethrough, said work block mounted on said frame;
   c. a pair of ultrasonic devices having acoustical horns, the acoustical horns being opposingly mounted on said frame so that when said acoustical horns of said ultrasonic devices are in contact with said container, one of said acoustical horns extends through said hole in said work block;
   d. means for synchronizing and monitoring the operation of said ultrasonic devices.

2. The apparatus of claim 1 further comprising means for registering said container within said work block.

3. The apparatus of claim 2 wherein the means for registering said container within said work block comprises:
   (a) a first cylinder having a first pad mounted on its piston rod, said first cylinder mounted on said frame and disposed adjacent said work block so that when said piston rod is retracted, said first pad rests in contact with said container;
   (b) a second cylinder mounted on said work block;
   (c) an arm rotatably mounted at one end on said work block and carrying a rod at the other end;
   (d) a second pad mounted on said rod;
   (e) a linkage rotatably mounted to said work block and connecting said second cylinder and said arm, so that selective movement of said second cylinder rotates said pad from a first position away from said container to a second position urged against said container, registering said container between said acoustical horns of said ultrasonic devices.

4. The apparatus of claim 1 further comprising means for ejecting said container from said work block when the sealing operation is completed.

5. The apparatus of claim 4 wherein said means for ejecting said container from said work block when the sealing operation is completed comprises:
  (a) a cylinder having a pad mounted on its piston rod, said cylinder mounted on said frame and disposed adjacent said work block so that said pad rests in contact with said container; and
  (b) means for actuating said cylinder when the sealing operation is determined to be satisfactory.

6. The apparatus of claim 1 further comprising means for imposing a load on said container through said acoustical horns when said acoustical horns are in contact with said container and a load cell for measuring said load.

7. The apparatus of claim 1 wherein the means for synchronizing and monitoring the operation of said ultrasonic devices comprises a suitably programmed general purpose computer.

8. Apparatus for ultrasonically sealing a food or tobacco container including a tube and an endcap, said endcap engaged with said tube, said apparatus comprising:

a. a pair of ultrasonic devices having acoustical horns, the acoustical horns being opposingly mounted so that when said acoustical horns of said ultrasonic devices are in contact with said container, said acoustical horns substantially surround the circumference of the tube adjacent the endcap; and
b. means for synchronizing and monitoring the operation of said ultrasonic devices.

9. The apparatus of claim 8 further comprising means for registering said container between said acoustical horns.

10. The apparatus of claim 9 wherein the means for registering the container between said acoustical horns comprises a work block.

11. The apparatus of claim 8 further comprising means for ejecting said container from between said acoustical horns when the sealing operation is completed.

12. The apparatus of claim 8 further comprising means for imposing a load on said container through said acoustical horns, when said acoustical horns are in contact with said container, and a load cell for measuring said load.

13. The apparatus of claim 8 wherein the means for synchronizing and monitoring the operation of said ultrasonic devices comprises a suitably programmed general purpose computer.

* * * * *